(12) United States Patent
Kodera et al.

(10) Patent No.: US 12,515,351 B2
(45) Date of Patent: Jan. 6, 2026

(54) WORKPIECE GRIPPING DETERMINATION MECHANISM FOR ROBOT HAND

(71) Applicant: FUJI CORPORATION, Chiryu (JP)

(72) Inventors: Tsukuru Kodera, Toyota (JP); Yasushi Suenami, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 105 days.

(21) Appl. No.: 18/576,156

(22) PCT Filed: Jul. 20, 2021

(86) PCT No.: PCT/JP2021/027125
§ 371 (c)(1),
(2) Date: Jan. 3, 2024

(87) PCT Pub. No.: WO2023/002565
PCT Pub. Date: Jan. 26, 2023

(65) Prior Publication Data
US 2024/0308087 A1    Sep. 19, 2024

(51) Int. Cl.
*B25J 13/08*    (2006.01)
*B25J 15/08*    (2006.01)

(52) U.S. Cl.
CPC .............. *B25J 13/082* (2013.01); *B25J 15/08* (2013.01)

(58) Field of Classification Search
CPC ................................ B25J 13/082; B25J 15/08
USPC ....................................................... 700/258
See application file for complete search history.

(56) References Cited

U.S. PATENT DOCUMENTS

| | | | |
|---|---|---|---|
| 2018/0147730 A1* | 5/2018 | Yamane | B25J 15/103 |
| 2020/0361093 A1* | 11/2020 | Furukawa | B25J 15/0052 |
| 2021/0008644 A1* | 1/2021 | Nagaosa | B23B 31/39 |
| 2022/0305675 A1* | 9/2022 | An | B25J 15/08 |
| 2023/0381907 A1* | 11/2023 | Nishimiya | B23Q 17/2428 |

FOREIGN PATENT DOCUMENTS

| | | |
|---|---|---|
| JP | 7-24536 U | 5/1995 |
| JP | 7-42678 U | 8/1995 |
| JP | 2009-160672 A | 7/2009 |

OTHER PUBLICATIONS

International Search Report issued Oct. 5, 2021 in PCT/JP2021/027125, filed on Jul. 20, 2021, 2 pages.

* cited by examiner

*Primary Examiner* — Kira Nguyen
(74) *Attorney, Agent, or Firm* — Oblon, McClelland, Maier & Neustadt, L.L.P.

(57) ABSTRACT

A workpiece gripping determination mechanism for a robot hand that determines presence or absence of a workpiece includes multiple master jaws to which chuck claws configured to grip a workpiece are attached and which slide in a radial direction, a detection device configured to detect a position of an outer diameter side sliding end or an inner diameter side sliding end by movement of the master jaw, and a control device configured to determine presence or absence of a workpiece gripped by the chuck claws based on a detection signal of the detection device. The detection device includes a determination flow path formed in the master jaw and configured to communicate with an air supply flow path of a robot main body, and a sensor configured to measure an air pressure of the air supply flow path.

5 Claims, 6 Drawing Sheets

WORKPIECE GRIPPING DETERMINATION MECHANISM FOR ROBOT HAND

TECHNICAL FIELD

The present disclosure relates to a workpiece gripping determination mechanism for a robot hand that grips a workpiece with a chuck.

BACKGROUND ART

A machine tool is provided with an automatic workpiece conveyance machine that automatically conveys a workpiece, and has a configuration in which the workpiece is gripped by a conveyance robot and the workpiece can be delivered to and received from a spindle chuck or the like. In the conveyance robot, the workpiece is gripped and released by a robot hand having a chuck mechanism. In the delivery of the workpiece performed by automatic control, it is necessary to confirm that the robot hand grips the workpiece according to a control command. Such an automatic machining machine requires determination in a chuck device, and Patent Literature 1 discloses a workpiece gripping determination mechanism provided in a chuck main body as a conventional art.

In the conventional art, when a workpiece is delivered from a conveyance robot to a chuck on a table, the workpiece gripped by chuck claws is brought into contact with an adjustment bolt, and a valve rod is pushed in against a biasing force of a spring. When air supplied from an air pump flows through a flow path, a pressure switch is operated, and a seating and gripping confirmation signal is output. Further, in a case where the workpiece is delivered to the conveyance robot at end of machining, when the chuck claw is opened and the workpiece is taken out by the conveyance robot, the valve rod protrudes due to the biasing force of the spring, and the air is discharged into the atmosphere, whereby a pressure switch is turned off.

PATENT LITERATURE

Patent Literature 1: JP-U-H7-24536

BRIEF SUMMARY

Technical Problem

However, a detection device acting by a workpiece to be gripped may not be able to perform accurate determination depending on a gripping state by a chuck. In the case of the conventional art, the workpiece is brought into contact with the adjustment bolt, and the valve rod is pushed in against the biasing force of the spring, thereby confirming the gripping. This is because a pusher such as the valve rod may not be pushed depending on the posture of the inclined workpiece. Further, the robot hand provided at a distal end portion of the conveyance robot is preferably small and lightweight because the robot hand moves while gripping the workpiece and performs accurate positioning. Therefore, the provision of a complicated workpiece gripping determination mechanism in addition to a chuck mechanism for gripping the workpiece is contrary to the demand for size and weight reduction.

In order to solve this problem, an object of the present disclosure is to provide a workpiece gripping determination mechanism for a robot hand that determines the presence or absence of a workpiece.

Solution to Problem

According to an aspect of the present disclosure, there is provided a workpiece gripping determination mechanism for a robot hand including: multiple master jaws to which chuck claws configured to grip a workpiece are attached and which slide in a radial direction: a detection device configured to detect a position of an outer diameter side sliding end or an inner diameter side sliding end by movement of the master jaw; and a control device configured to determine presence or absence of a workpiece gripped by the chuck claws based on a detection signal of the detection device.

Advantageous Effects

According to the above configuration, the detection device detects whether the master jaw that moves in gripping or releasing the workpiece is positioned at the outer diameter side sliding end or an inner diameter side sliding end, and the control device receiving the detection signal can determine the presence or absence of the gripped workpiece in the robot hand. As a result, with the workpiece gripping determination mechanism of the present disclosure, it is possible to provide a simple configuration for confirming that the master jaw is positioned at the sliding end without using a conventional pusher for the robot hand.

DESCRIPTION OF EMBODIMENTS

Figure 1:
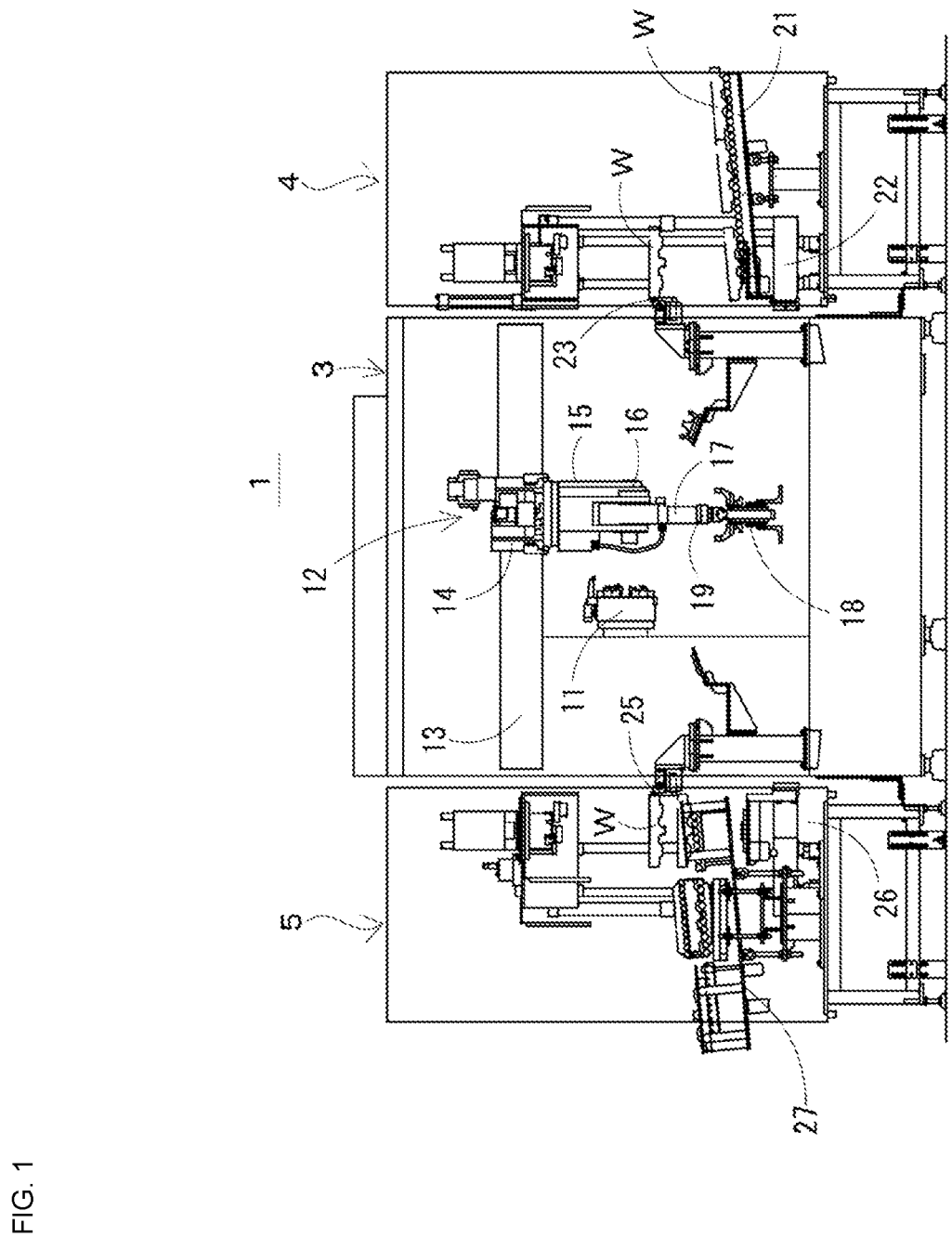
FIG. 1 is a simplified front view of a machine tool.

An embodiment of a workpiece gripping determination mechanism for a robot hand according to the present disclosure will be described below with reference to the drawings. A robot hand of the present embodiment constitutes a part of an automatic workpiece conveyance device incorporated in a machine tool, and FIG. 1 is a front view illustrating the machine tool in a simplified manner. Machine tool 1 has workpiece machining section 3 at a center thereof, workpiece supply section 4 on an inlet side on the right side of the drawing, and workpiece discharge section 5 on an outlet side on the left side of the drawing. Workpiece machining section 3, workpiece supply section 4, and workpiece discharge section 5 are each covered with an exterior cover, an opening/closing door and a window are formed on a front surface of the cover, and an operation panel and the like are provided. FIG. 1 illustrates an internal structure in which a cover front surface is omitted.

Workpiece machining section 3 is provided with a spindle device having spindle chuck 11 and automatic workpiece conveyance device 12 for delivering a workpiece to spindle chuck 11. Although not illustrated in FIG. 1, workpiece machining section 3 includes a tool table provided with a tool for machining a workpiece, a moving device for moving the tool table, and the like. Accordingly, in workpiece machining section 3, the workpiece is delivered to spindle chuck 11 by automatic workpiece conveyance device 12, and predetermined machining is performed on the rotating workpiece by, for example, a cutting tool being brought into contact with the workpiece.

In workpiece machining section 3, horizontal beam member 13 including a guide rail is installed in an upper portion on a front side in the machine, and traveling device 14 is assembled thereto. Traveling device 14 is configured such that a travel table is attached so as to be able to slide on a guide rail, and is linearly moved by a drive motor via a ball screw mechanism. In automatic workpiece conveyance device 12, robot arm 15 is mounted on traveling device 14. Robot arm 15 extends downward and is attached to traveling device 14 via a revolving table. In robot arm 15, lower forearm portion 17 can be bent by joint mechanism 16, and robot hand 18 having a chuck is assembled to a distal end part of forearm portion 17 via rotation mechanism 19.

Workpiece supply section 4 is provided with roller conveyor 21, and is configured such that workpiece W is loaded from an entrance of a side surface of the machine body and advances toward workpiece machining section 3 side by inclination. Workpiece lifting and lowering device 22 for lifting workpiece W is provided downstream of roller conveyor 21. Accordingly, multiple workpieces W are arranged in a row on roller conveyor 21, and leading workpiece W is lifted upward by workpiece lifting and lowering device 22. Clamp device 23 is provided at the raised delivery position, and workpiece W is delivered to automatic workpiece conveyance device 12 to be carried into workpiece machining section 3. Meanwhile, workpiece discharge section 5 is configured to discharge machined workpiece W fed from workpiece machining section 3. Workpiece discharge section 5 has a symmetrical configuration with respect to workpiece supply section 4, and is configured such that workpiece lifting and lowering device 26 lowers workpiece W delivered to clamp device 25 and workpiece W is fed to roller conveyor 27.

Figure 2:
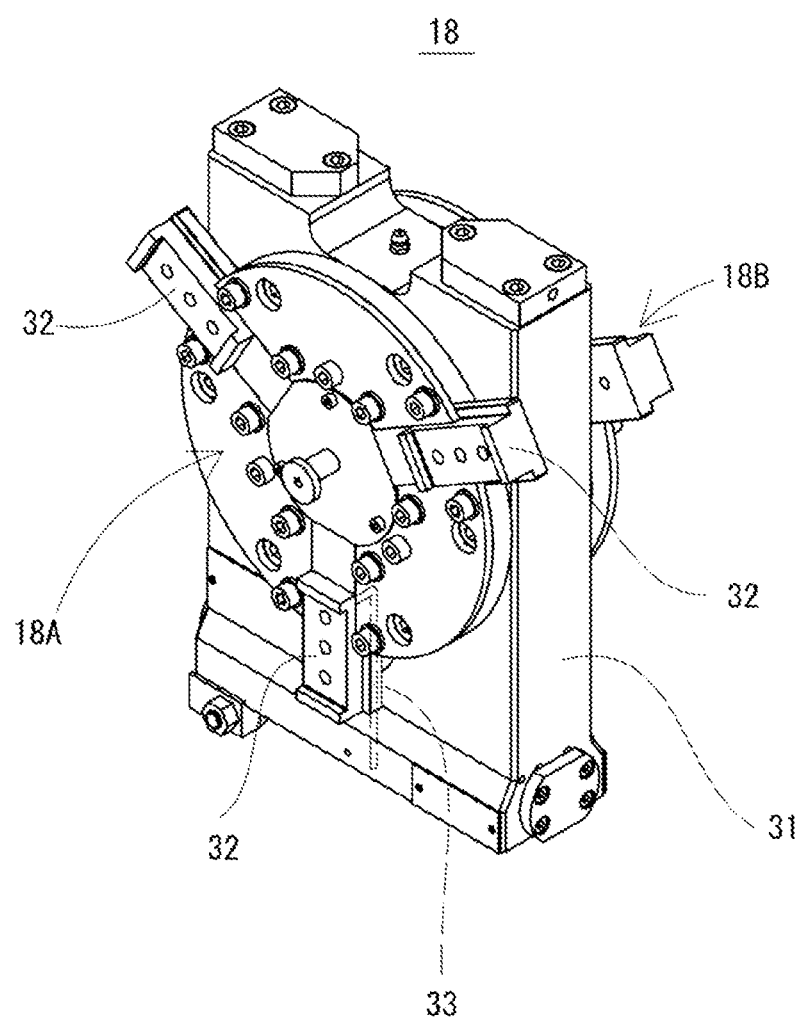
FIG. 2 is an external perspective view illustrating a robot hand.

Next, FIG. 2 is an external perspective view illustrating robot hand 18. Robot hand 18 has first chuck 18A on the front side of the drawing and second chuck 18B on the back side thereof on base block 31 of robot hand 18, and is capable of gripping workpiece W by both of them. First and second chucks 18A and 18B having the same structure are configured such that three master jaws 32 radially arranged slide in a radial direction, and chuck claws corresponding to workpiece W can be attached to and detached from master jaw 32. Accordingly, in the case of the outer diameter chuck for workpiece W, workpiece W is gripped by the chuck claws by moving three master jaws 32 in the inner diameter direction, and workpiece W is released by moving three master jaws 32 in the outer diameter direction. Conversely, in the case of the inner diameter chuck, master jaw 32 is moved in the outer diameter direction to grip workpiece W, and workpiece W is released by moving master jaw 32 in the inner diameter direction.

Robot hand 18 performs clamping in which first chuck 18A and second chuck 18B grip the workpiece and unclamping in which first chuck 18A and second chuck 18B release the workpiece. Each of first and second chucks 18A and 18B have three master jaws 32 for gripping the workpiece arranged radially at equal intervals of 120°, and each master jaws 32 is assembled to base block 31 so as to slide in the radial direction. An opening/closing mechanism in which a rack piston is meshed with a clamp gear is configured inside base block 31. The rack piston is displaced in a pressure application direction by the hydraulic pressure of supplied and discharged working oil, and a clamp gear is rotated by a predetermined amount in accordance with the displacement, whereby a synchronized linear motion in the radial direction is applied to three master jaws 32.

In addition to the working oil, robot hand 18 is provided with a workpiece gripping determination mechanism for determining whether the workpiece is clamped by the chuck claws or unclamped. As described above, the conventional workpiece gripping determination mechanism includes a pusher or the like that acts by the gripping state of the workpiece. The workpiece gripping determination mechanism of the present embodiment checks master jaw 32 that operates when gripping and releasing the workpiece instead of the mechanism that directly determines the presence or absence of the workpiece. Therefore, air is supplied to robot hand 18 in addition to the working oil.

Figure 3:
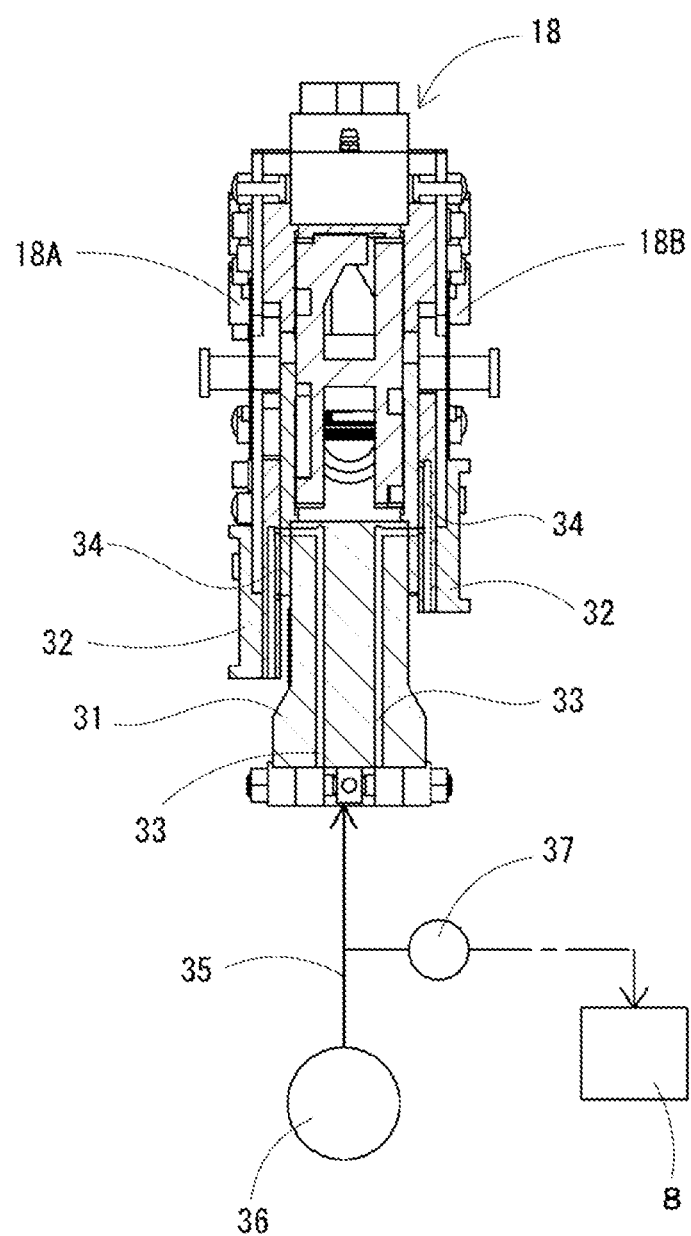
FIG. 3 is a view illustrating the workpiece gripping determination mechanism of a first embodiment.

FIG. 3 is a diagram illustrating the workpiece gripping determination mechanism. The workpiece gripping determination mechanism is configured in the same manner for both first and second chucks 18A and 18B. Air supply flow path 33 for feeding air is formed in base block 31. Air supply flow path 33 is formed toward one of three master jaws 32 that move by the same stroke at the same timing. Air pump 36 installed outside is connected to air supply flow path 33 via air pipe 35, and air having a predetermined pressure is supplied. In the workpiece gripping determination mechanism, pressure switch 37 for detecting an air pressure is provided in air pipe 35, and pressure switch 37 is connected to control device 8 via a signal cable.

Determination flow path 34 for discharging air is formed in master jaw 32 on which air supply flow path 33 abuts. First chuck 18A and second chuck 18B illustrated in FIG. 3 are positioned at an end portion of stroke range S (see FIG. 5) in which each master jaw 32 is movable. Master jaw 32 of first chuck 18A has moved to an outer diameter side sliding end of stroke range S, and master jaw 32 of second chuck 18B has moved to an inner diameter side sliding end of stroke range S. Determination flow path 34 is configured to be connected to air supply flow path 33 when master jaw 32 is positioned at both sliding ends.

Figure 4:
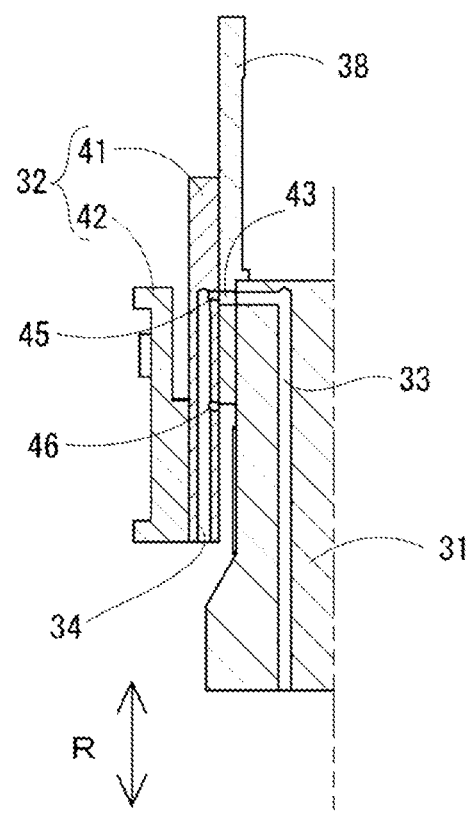
FIG. 4 is an enlarged cross-sectional view illustrating a configuration in an air flow path portion on a first chuck side.

FIG. 4 is an enlarged cross-sectional view illustrating a configuration in an air flow path portion on first chuck 18A side. Master jaw 32 has sliding portion 41 assembled so as to slide in the radial direction indicated by arrow R, and attachment portion 42 to which the chuck claw is attached, and determination flow path 34 is formed in sliding portion 41. In determination flow path 34, an opening portion configured to discharge air to the atmosphere is formed on an end surface of sliding portion 41 in the sliding direction (R direction), and first connection section 45 and second connection section 46 are formed on base block 31 side. Plate 38 is provided between master jaw 32 and base block 31, and connecting hole 43 constituting a part of air supply flow path 33 is formed.

First connection section 45 is formed so as to overlap connecting hole 43 when master jaw 32 is positioned at the outer diameter side sliding end. Second connection section 46 is formed so as to overlap connecting hole 43 when master jaw 32 is positioned at the inner diameter side sliding end. Accordingly, when master jaw 32 is positioned at one of the sliding ends, the air fed into air supply flow path 33 is discharged to the atmosphere from determination flow path 34. Diameters of first connection section 45 and second connection section 46 are smaller than that of connecting hole 43, and this is to make them smaller than play (clamp allowance) when gripping the workpiece.

Figure 5:
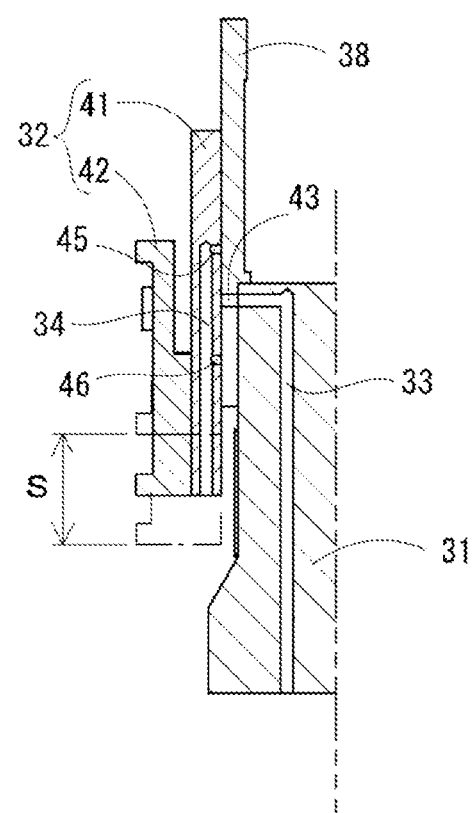
FIG. 5 is an enlarged cross-sectional view illustrating the configuration in the air flow path portion on the first chuck side.

Here, FIG. 5 is an enlarged cross-sectional view illustrating a configuration in the air flow path portion on first chuck 18A side as in FIG. 4. In particular, the position of master jaw 32 when the workpiece is gripped by the chuck claws is illustrated. The position of master jaw 32 gripping the workpiece varies depending on not only the size of the workpiece but also the outer diameter chuck or the inner diameter chuck, but master jaw 32 is positioned in the middle of stroke range S. Therefore, connecting hole 43 communicating with air supply flow path 33 is positioned on a sliding contact side surface of sliding master jaw 32, and the opening portion thereof is closed. That is, air supply flow path 33 is configured to be a closed flow path except that connecting hole 43 overlaps and communicates with first and second connection sections 45 and 46.

Subsequently, in machine tool 1 in which the workpiece gripping determination mechanism of the robot hand is configured, a cutting tool is brought into contact with the rotating workpiece in workpiece machining section 3, and predetermined machining is performed. At this time, automatic workpiece conveyance device 12 delivers the workpiece before machining to spindle chuck 11, and takes out the machined workpiece from spindle chuck 11 after the machining process. In robot hand 18 for delivering the workpiece, master jaw 32 is operated by a hydraulic operation, and the workpiece is gripped and released by opening and closing the chuck claws.

For example, in robot hand 18 before the outer diameter chuck of the workpiece, master jaw 32 is positioned at the outer diameter side sliding end as in first chuck 18A illustrated in FIGS. 4 and 3, and first connection section 45 of determination flow path 34 overlaps connecting hole 43 of air supply flow path 33. At this time, the air supplied from air pump 36 flows from air supply flow path 33 to determination flow path 34 through first connection section 45 and is discharged to the atmosphere. Accordingly, the air pressure in air supply flow path 33 and air pipe 35 is lower than a predetermined threshold value.

Next, in robot hand 18 that operates in accordance with the workpiece gripping command, master jaw 32 moves in the inner diameter direction, and the chuck claws are brought into contact with the workpiece. Thereby, master jaw 32 is stopped at the position as illustrated in FIG. 5, and connecting hole 43 of air supply flow path 33 is blocked by the side surface of master jaw 32. Since the flow of air supplied from air pump 36 to air supply flow path 33 is stopped, the air pressure in air supply flow path 33 becomes high, and a detection signal is transmitted from pressure switch 37 to control device 8 when the air pressure exceeds the threshold value. Then, control device 8 that has received the detection signal determines that the workpiece has been gripped, and issues the next drive control instruction.

However, the workpiece may not be gripped by robot hand 18 and may be dropped. In this case, master jaw 32 that has moved in the inner diameter direction is positioned at the inner diameter side sliding end as second chuck 18B illustrated in FIG. 3. Then, second connection section 46 of determination flow path 34 overlaps connecting hole 43 of air supply flow path 33. At this time, since the air supplied from air pump 36 flows from air supply flow path 33 to determination flow path 34 through second connection section 46 and is discharged to the atmosphere, the air pressure in air supply flow path 33 remains lower than a predetermined threshold value. Accordingly, since the detection signal that would normally be transmitted from pressure switch 37 is not transmitted, control device 8 performs the error determination. Although the outer diameter chuck has been described, the workpiece gripping determination and the error determination are performed by the same operation even when the inner diameter chuck that grips the workpiece from the inside is performed.

As a result, according to the present embodiment, it is possible to provide a workpiece gripping determination mechanism having a simple configuration in which a flow path is formed for one master jaw 32 without using a conventional pusher for robot hand 18. Therefore, robot hand 18 of the present embodiment is a workpiece gripping determination mechanism in which the number of components is reduced, and the number of improvements is reduced compared to the conventional robot hand. Further, with the workpiece gripping determination mechanism, it is also possible to reduce the weight of robot hand 18 attached to the distal end portion of robot arm 15. Further, in the workpiece gripping determination mechanism of the present embodiment, first connection section 45 and second connection section 46 of determination flow path 34 overlap connecting hole 43 of air supply flow path 33, and thus it can be confirmed that master jaw 32 is positioned at the outer diameter side sliding end or the inner diameter side sliding end by discharging air to the atmosphere. That is, it is also possible to confirm whether the opening and closing operation of the chuck in stroke range S is normal.

In addition, the workpiece gripping determination mechanism of the present embodiment can reliably determine the presence or absence of the workpiece by confirming the state where master jaw 32 is positioned at the outer diameter side sliding end or the inner diameter side sliding end. For example, in the configuration in which the determination is made by pushing the pusher by the workpiece as in the conventional art, the workpiece may be inclined and the pusher may not be pushed even though the workpiece is gripped. In such a case, the following control is performed based on the determination that the workpiece is not gripped. In this regard, according to the present embodiment, since the diameters of first connection section 45 and second connection section 46 are smaller than the clamp allowance, it is possible to determine that there is a workpiece regardless of the posture of the gripped workpiece.

Figure 6:
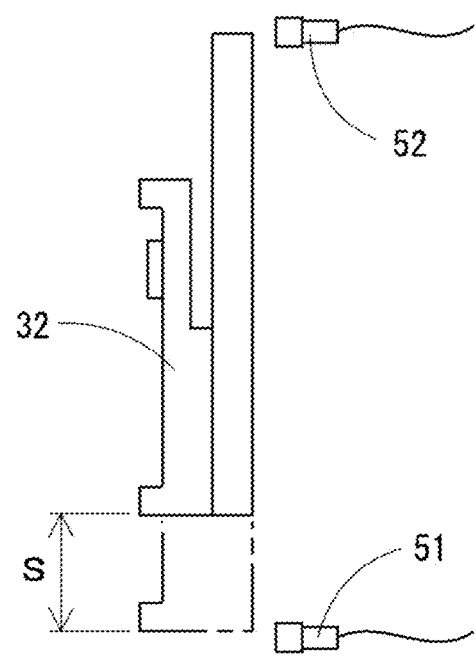
FIG. 6 is a conceptual diagram illustrating a part of a workpiece gripping determination mechanism according to a second embodiment.

Next, a workpiece gripping determination mechanism of a robot hand according to a second embodiment will be described. FIG. 6 is a conceptual diagram illustrating a part of the workpiece gripping determination mechanism. Similarly to the first embodiment, the workpiece gripping determination mechanism is also configured in robot hand 18 of automatic workpiece conveyance device 12, and detects a state where master jaw 32 is positioned at the sliding end. However, in the present embodiment, first and second proximity switches 51 and 52 for directly detecting the presence of master jaw 32 are used instead of the air pressure.

First and second proximity switches 51 and 52 are incorporated in base block 31 and connected to control device 8 via signal cables. First proximity switch 51 detects the outer diameter side distal end part when master jaw 32 is positioned at the outer diameter side sliding end. Meanwhile, second proximity switch 52 detects the inner diameter side distal end part when master jaw 32 is positioned at the inner diameter side sliding end. In the case of the present embodiment, first and second proximity switches 51 and 52 may be installed separately in any two of three master jaws 32 to be synchronized.

In robot hand 18 to which the workpiece is delivered, master jaw 32 is operated by a hydraulic operation, and the workpiece is gripped and released by opening and closing the chuck claws. For example, in robot hand 18 before the outer diameter chuck of the workpiece, master jaw 32 is positioned at the outer diameter side sliding end as in first chuck 18A illustrated in FIG. 3. Therefore, a detection signal detected by first proximity switch 51 is transmitted to control device 8, and it is determined that the state is an unclamped state.

Next, in robot hand 18 that operates in accordance with the workpiece gripping command, master jaw 32 moves in the inner diameter direction, and the chuck claws are brought into contact with the workpiece. As a result, master jaw 32 is stopped at the position illustrated in FIG. 5, but at this time, the presence of master jaw 32 cannot be confirmed by the first and second proximity switches 51 and 52. Accordingly, in control device 8, it is determined that the workpiece is gripped by robot hand 18, and the following drive control is performed.

However, the workpiece may not be gripped by robot hand 18 operated by the workpiece gripping command, and master jaw 32 may be positioned at the inner diameter side sliding end as in second chuck 18B illustrated in FIG. 3. Master jaw 32 is detected by second proximity switch 52, and the error determination is made in control device 8 to which the detection signal is transmitted. Although the outer diameter chuck has been described here, the workpiece gripping determination and the error determination are performed by the same operation even when the inner diameter chuck for gripping the workpiece from the inside is performed.

According to the present embodiment, it is possible to achieve a simple configuration in which first and second proximity switches 51 and 52 are incorporated in base block 31 without using a conventional pusher for robot hand 18. Therefore, it is possible to reduce the number of components of robot hand 18, to provide a workpiece gripping determination mechanism with less improvement from the conventional art, and to reduce the weight of robot hand 18 attached to the distal end portion of robot arm 15. Then, similarly to the first embodiment, it is possible to determine that there is a workpiece in a state of being gripped regardless of the posture of the workpiece, and it is also possible to confirm whether the opening and closing operation of the chuck in stroke range S is normal.

Although one embodiment of the present disclosure has been described, the present disclosure is not limited to the embodiment, and various modifications can be made without departing from the gist thereof.

For example, the robot hand is not limited to that of the above embodiment. Further, the detection switch provided in the robot hand may be a contact detection type such as a limit switch other than the proximity sensor.

REFERENCE SIGNS LIST

1: machine tool, 3: workpiece machining section, 8: control device, 12: automatic workpiece conveyance device, 18: robot hand, 18A: first chuck, 18B: second chuck, 31: base block, 32: master jaw, 33: air supply flow path, 34: determination flow path, 35: air pipe, 36: air pump, 37: pressure switch, 43: connecting hole, 45: first connection section, 46: second connection section

The invention claimed is:

1. A workpiece gripping determination mechanism for a robot hand, the workpiece gripping determination mechanism comprising:
multiple master jaws to which chuck claws configured to grip a workpiece are attached and which slide in a radial direction;
a detection device configured to detect a position of an outer diameter side sliding end or an inner diameter side sliding end by movement of the master jaw; and
a control device configured to determine presence or absence of a workpiece gripped by the chuck claws based on a detection signal of the detection device,
wherein the detection device includes a determination flow path in the master jaw and configured to communicate with an air supply flow path of a robot main body portion in a state where the determination flow path is positioned at the outer diameter side sliding end or the inner diameter side sliding end to discharge air to atmosphere.

2. The workpiece gripping determination mechanism for a robot hand according to claim 1, wherein the detection device includes a sensor configured to measure an air pressure of the air supply flow path.

3. The workpiece gripping determination mechanism for a robot hand according to claim 1, wherein the determination flow path is formed in one of the multiple master jaws, and the air supply flow path is formed for the master jaw.

4. The workpiece gripping determination mechanism for a robot hand according to claim 1, wherein in the determination flow path, an opening portion configured to discharge air to atmosphere is formed on an end surface of the master jaw in a sliding direction, and a first connection section and a second connection section communicating with the air supply flow path are formed when the master jaw is positioned at the outer diameter side sliding end or the inner diameter side sliding end.

5. The workpiece gripping determination mechanism for a robot hand according to claim 1, wherein the detection device is a detection sensor that is provided in a main body portion of the robot hand so that an attachment position thereof is adjustable and that is configured to detect in a non-contact manner that the master jaw is positioned at the outer diameter side sliding end or the inner diameter side sliding end.

* * * * *